Patented Mar. 21, 1944

2,344,579

UNITED STATES PATENT OFFICE 2,344,579

COMPOSITION FOR COATING CONCRETE

George W. Whitesides, Anchorage, Ky.

No Drawing. Original application June 1, 1942, Serial No. 445,525. Divided and this application September 11, 1943, Serial No. 502,059

3 Claims. (Cl. 106—269)

This invention relates to an improved composition for coating freshly laid cement concrete to protect it against the deleterious loss of moisture, and the product resulting therefrom.

Heretofore, the application of a water-impervious coating or film to the surface of freshly laid concrete has been proposed in such patents as Hayden #1,684,671, Rowan et al. #1,867,421 and Reynolds #1,942,000. The coatings proposed, however, are not completely satisfactory primarily because their costs are relatively high when used in the amounts necessary to produce satisfactory water retention efficiencies.

The principal object of this invention is to provide an inexpensive, highly efficient and effective coating composition or coating membrane for concrete.

I have discovered that a composition, composed of an insoluble metallic fatty-acid soap in the form of a mechanical suspension as distinguished from a gel, a non-volatile hydrocarbon base or carrier of a bituminous character, and a suitable volatile hydrocarbon solvent for the base, has greatly improved water-proofing qualities, readily forms a thin, continuous, highly effective coating or membrane when applied to concrete, and provides a highly efficient and unusually effective water-repellent and water-impervious film for the concrete.

The coating may be sprayed, brushed or otherwise applied to the concrete. Since its effectiveness depends, to some extent, on the time of application, it preferably is applied as soon as possible after the concrete is poured and processed to finished form. When the concrete is quite wet, it is desirable to delay the application until the superficial water has subsided. Where, as in building constructions, the concrete is enclosed by forms, the coating may be applied to the forms before the concrete is poured and to the concrete immediately after the forms have been removed. The coating is effective immediately upon application and continues, as long as it adheres firmly to the concrete, to perform its protective functions efficiently and effectively. Its adhesive properties are such that it will remain intact long after the concrete has become permanently set unless removed or destroyed by means other than the elements.

The water-insoluble, metallic, fatty-acid soaps are preferably, but not necessarily, taken from the aquaphobic group. Among the soaps satisfactory for use are zinc stearate, aluminum stearate, and any of the palmitates or oleates. A soap made from a technical grade of a fatty acid has been found highly satisfactory for use although it usually contains appreciable quantities of other soap.

The non-volatile hydrocarbon base or carrier is of a bituminous character. With a bituminous base, the resulting composition is dark in color. This dark type is highly recommended for use where temperature variations are not extreme and also where a highly effective protective coating is desired at minimum cost regardless of appearance.

Excellent results can be obtained with bituminous bases composed of asphalt pitch, coal-tar pitch, or fatty-acid pitch. Of these, asphalt and coal-tar pitches are preferred because they have a low saponification number; hence they do not react with the constituents of the concrete.

The volatile solvent to be used will be any of the well-known materials capable of dissolving the hydrocarbon bases mentioned. For example, volatile hydrocarbon petroleum solvents, such as mineral spirits, or, coal-tar solvents, such as toluene, may be used.

In the preparation of an exemplary composition made according to my invention, a soap such as aluminum stearate is ground in a ball mill to the particle size which has been found to be best adapted for its mechanical mixture and/or suspension with the base and solvent and the least likely to form a gel at atmospheric temperature except after an infinitely long period of time. A grinding mixture composed of 25% aluminum stearate and 75% mineral spirits has been found entirely satisfactory. The bituminous material in a suitable solvent and the ground aluminum stearate are mixed in a suitable mixer, such as the counter-current pump type, and sufficient solvent added to secure the final desired solvent content.

In the grinding operation and in the subsequent mixing of the solvent, the soap, and the base, it is important that predetermined conditions, particularly as to temperature, be maintained so that there is no tendency for the soap to gel. Such conditions must also be maintained prior to the actual application of the composition. A composition in which the soap is gelled does not form a base and an overlying layer of soap when applied to concrete and will not perform as efficiently as a composition made in accordance with this invention wherein the soap is not gelled but is incorporated as a mechanical mixture and/or suspension.

By keeping the temperature at all times below approximately 122° F. to 140° F., and preferably below 113° F., gelling and undesirable solution of the aluminum stearate is prevented. As long as the soap is mechanically incorporated and maintained at a temperature below these temperatures, the greater portion thereof will remain, I believe, as a mechanical mixture or suspension and upon application to the concrete will form at the top of the film in overlying layers as hereinafter described. If the temperature of the soap is permitted to exceed these temperatures, gel formation proceeds to a degree dependent upon the time of exposure to the elevated temperature and the temperature itself, the increase in viscosity, by reason of the gel formation, being a direct function of the time and temperature.

This is established by the following table which gives in column 1 the temperatures at which the viscosities of the various compositions mentioned in the other columns, were measured by the Engler method; in column 2, the viscosities at different temperatures of a composition made in accordance with my invention and containing aluminum stearate incorporated mechanically; in column 3, the viscosities at different temperatures of a similar composition after it had been heated to 194° F. for one hour to insure the solution and gelation of the aluminum stearate; and in column 4, the viscosities at different temperatures of the same composition after it had been heated to 194° F. for one hour and then allowed to stand for 24 hours.

*Viscosity*

[Engler time—50 cc.]

| 1 | 2 | 3 | 4 |
|---|---|---|---|
| Temperature | Al. stearate dispersed by grinding (viscosity) | Al. stearate heated to 194° F. for 1 hr. (immediate viscosity) | Al. stearate heated to 194° F. for 1 hr. (viscosity 24 hours later) |
| °F. | | | |
| 59 | 20.0 | Solid | Solid |
| 68 | 19.0 | Solid | Solid |
| 86 | 16.0 | Semi-solid | Solid |
| 104 | 14.5 | Over 80 | Semi-solid |
| 122 | 14.5 | 63 | Semi-solid |
| 140 | 15.5 | 49.5 | Over 80 |
| 158 | 17.5 | 37.5 | 52 |
| 176 | 21.5 | 31.5 | 37.5 |
| 194 | 28.0 | 28.0 | 28.0 |

It will be noted that in the temperature range between 122° F. and 140° F., the viscosity of my composition (column 2) increases with the temperature. Within a temperature range of 59° F. up beyond 104° F. but not above 122° F., the viscosity curve of my composition can be reversed. Above that range, the aluminum stearate begins to gel and the viscosity curve assumes a different path for each different degree of gelation. Where the compositions are first heated to 194° F. (columns 3 and 4), the formation of gel to a marked degree is immediately apparent. In these latter cases, the viscosities, at the higher temperatures, decrease because of the increased fluidity of the gel.

The increased moisture-retention efficiency which results upon the mechanical dispersion of a soap, such as aluminum stearate, in a base-solvent solution is indicated by the following table wherein column 1 lists the days on which observations were made; column 2 notes the moisture lost from a cement pat covered with a single coating of my composition, the soap ingredient comprising ground, mechanically-dispersed aluminum stearate; column 3 notes the higher moisture loss under identical conditions except for the omission of the soap ingredient from the composition; and column 4 notes the gain in efficiency due to the addition of the soap, the efficiency gain being calculated on the assumption that each figure in column 3, for the soapless composition, represents zero efficiency.

*Moisture loss 5½" x ¾" cement pats at 125° F.*

| 1 | 2 | 3 | 4 |
|---|---|---|---|
| No. days (elapsed time) | Gum solution-dispersed aluminum stearate | Solution without aluminum stearate | Increased efficiency of 2 over 3 |
| | Grams | Grams | Percent |
| 1 | 2.1 | 5.2 | 60 |
| 3 | 7.9 | 17.4 | 55 |
| 6 | 15.2 | 31.8 | 52 |
| 11 | 23.7 | 43.5 | 46 |
| 14 | 29.8 | 47.8 | 38 |

From the above it will be noted that an increased efficiency as high as 60% is secured during the early setting of the cement when it is most desirable.

The importance of maintaining the aluminum stearate in the form of a mechanical dispersion or suspension (which may be accomplished by grinding it into the base-solvent solution at the non-gelling temperature previously noted) as distinguished from maintaining it in the form of a gel, is evident from the following table setting forth the comparative results on standard concrete pats. In this table: column 1 lists the days on which the observations were made; column 2, the moisture loss in grams through a single coating containing dispersed aluminum stearate; column 3, the moisture loss in grams through a single coating containing gelled aluminum stearate; and column 4 the percentage gain in efficiency of my "dispersed" composition over the "gelled" composition, the assumed efficiency of the latter being zero.

*Moisture loss—3" x ½" pats—at 70° F.*

| 1 | 2 | 3 | 4 |
|---|---|---|---|
| No. days (elapsed time) | Aluminum stearate (dispersed by grinding) | Aluminum stearate (gelled) | Increased efficiency of 2 over 3 |
| | Grams | Grams | Per cent |
| 2 | .1 | .3 | 67 |
| 4 | .3 | .7 | 57 |
| 6 | .45 | .9 | 50 |
| 8 | .65 | 1.1 | 41 |
| 10 | .9 | 1.45 | 38 |
| 14 | 1.3 | 2. | 35 |

Again it will be noted that the increased efficiency of the dispersed aluminum stearate is as high as 67% when it is most desirable, i. e., during the early stage of the setting of the concrete.

I have found that my composition is extremely efficient and effective even when only one thin coating or film is employed. While the precise reason for its remarkable effectiveness is not clearly understood, it is believed that the nonvolatile hydrocarbon base, when dissolved by the solvent, acts as a carrier for the soap, which remains substantially undissolved. When applied, a good proportion, if not all of the soap, is believed to float to the top of the base or carrier forming a film thereover, consisting of a number of soap layers. The base solidifies upon the evaporation of the solvent, leaving the concrete protected first by the base or carrier, and second by the overlying and, possibly, dispersed particles of soap. The base, unquestionably, acts as a water-proofing or water-retaining agent but not necessarily as a highly efficient one. The soap is believed to act as a more efficient water-proofing or water-retaining and water-repellent agency. As a result, it is believed that the base restricts the passage of water from the concrete to the overlying soap layers, while the soap layers more effectively restrict the passage to atmosphere of such water as may pass through the base.

To illustrate suitable compositions made in accordance with this invention, the following examples, wherein the proportions are by weight, are given:

*Example 1—Bituminous base*

| | Parts |
|---|---|
| Solid asphalt or coal-tar pitch | 50 |
| Mineral spirits or toluene | 50 |
| Aluminum stearate or zinc stearate | 3 |

It will be readily appreciated that the relative amounts of base and solvent will depend upon the consistency desired in the composition. Ordinarily, equal parts of both will give excellent results. The soap content of the composition, however, should not exceed substantially more than 5% of the composition as a whole because above 5%, the results are not materially improved in proportion to the increased cost. Preferably, more than 1% of soap should be used since approximately that amount is believed to go into solution when mixed with the other ingredients, despite the manner in which it is mixed.

The effectiveness of my composition may be demonstrated by comparison with other compositions presently available on the market. Dark-type compositions available heretofore and proposed herein have relative water-proofing efficiencies of 69% and 91%.

This application is a division of my co-pending application, Serial No. 445,525, filed June 1, 1942, which is a continuation-in-part of my application, Serial No. 264,491, filed March 27, 1939, for Method of and composition for coating concrete.

Having described my invention, I claim:

1. A coating composition for curing freshly placed concrete comprising: a non-volatile, water-repellent, film-forming base selected from a bituminous group consisting of asphalt pitch, coal-tar pitch, and fatty-acid pitch; a volatile hydrocarbon solvent for the base; and a mechanically-dispersed, water-insoluble, water-repellent, metallic, fatty-acid soap, the quantity of soap being sufficient to form, when the coating is applied and the solvent evaporated, a layer of undissolved soap overlying the base.

2. A coating composition adapted to be spread in the form of a relatively thin film over freshly placed concrete as a curing membrane comprising: a non-volatile, water-repellent, film-forming base selected from a bituminous group consisting of asphalt, coal-tar, and fatty-acid pitches; a volatile solvent for the base; and a substantially water-insoluble, water-repellent, metallic fatty-acid soap mechanically mixed with the solvent and base in the form of a mechanical dispersion.

3. A coating composition adapted to be spread in the form of a relatively thin film over freshly placed concrete as a curing membrane, comprising: a non-volatile, water-repellent, film-forming base selected from a bituminous group consisting of asphalt, coal-tar, and fatty-acid pitches; a volatile solvent for the base; and a substantially water-insoluble, water-repellent, metallic fatty-acid soap mixed with the solvent and base in the form of a mechanical dispersion and in an amount of between 1% and 5%.

GEORGE W. WHITESIDES.